United States Patent
Boxum

(10) Patent No.: US 6,318,098 B1
(45) Date of Patent: *Nov. 20, 2001

(54) AMBIENT TEMPERATURE CONTROL FOR ABSORPTION REFRIGERATOR

(75) Inventor: Bruce Boxum, Angola, IN (US)

(73) Assignee: Dometic Corporation, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,352

(22) Filed: May 12, 2000

Related U.S. Application Data

(63) Continuation of application No. 09/363,710, filed on Jul. 29, 1999, now Pat. No. 6,098,414, which is a continuation of application No. 08/985,638, filed on Dec. 5, 1997, now Pat. No. 5,966,965.

(51) Int. Cl.$^7$ ............................. F25B 39/04; F25B 15/00
(52) U.S. Cl. ................................. 62/183; 62/485
(58) Field of Search ............................. 62/183, 485, 141, 62/239, 244

(56) References Cited

U.S. PATENT DOCUMENTS

| | | | |
|---|---|---|---|
| 1,769,119 | * 7/1930 | Davenport | ............................. 62/183 |
| 3,245,224 | 4/1966 | Wilkinson . | |
| 3,512,371 | 5/1970 | Ake Gurt et al. . | |
| 3,613,390 | 10/1971 | Bawel . | |
| 3,738,120 | 6/1973 | Beatenbough . | |
| 3,771,320 | 11/1973 | Kenneryd et al. . | |
| 3,817,451 | * 6/1974 | Ramsey | ................................. 62/184 |
| 4,016,730 | 4/1977 | DeVilliers . | |
| 4,056,947 | 11/1977 | Partsch . | |
| 4,178,770 | 12/1979 | Fox . | |
| 4,246,761 | 1/1981 | Phillips et al. . | |
| 4,274,264 | 6/1981 | Andres . | |
| 4,286,569 | 9/1981 | Bergman et al. . | |
| 4,358,934 | 11/1982 | VanKirk . | |
| 4,487,026 | 12/1984 | Alfano . | |
| 4,498,309 | 2/1985 | Kobayashi et al. . | |
| 4,651,922 | * 3/1987 | Noba | ...................................... 236/35 |
| 5,001,904 | 3/1991 | Blomberg . | |
| 5,007,251 | 4/1991 | Thuez et al. . | |
| 5,074,122 | * 12/1991 | Babin et al. | ............................ 62/183 |
| 5,138,844 | * 8/1992 | Clanin et al. | ............................ 62/89 |
| 5,291,749 | 3/1994 | Schulak . | |
| 5,355,693 | 10/1994 | McConnell et al. . | |
| 5,484,012 | 1/1996 | Hiratsuka . | |
| 5,547,125 | 8/1996 | Hennessee et al. . | |
| 5,782,105 | 7/1998 | Stork . | |
| 5,966,965 | * 10/1999 | Boxum | ................................. 62/485 |
| 6,098,414 | * 8/2000 | Boxum | ................................. 62/141 |

OTHER PUBLICATIONS

Norcold, "Norcold Model 1200 Installation Requirements", Nov. 1996.

* cited by examiner

*Primary Examiner*—William Doerrler
(74) *Attorney, Agent, or Firm*—Pearne & Gordon LLP

(57) ABSTRACT

A ventilation system for an absorption refrigerator having a condenser and an absorber and located in a slide-out room of a recreational vehicle. The ventilation system includes a generally vertical air passage in which the condenser and the absorber are located, a lower vent for the intake of ambient air into the air passage, an upper vent for exhausting heated air from the air passage, and an air assist system for forcing air flow through the air passage only when the temperature of the ambient air is too high for an efficient natural draft. Both the lower and upper vents are in the side wall of the slide-out room. The air assist system includes a blower positioned to promote airflow within the air passage over the condenser and the absorber, a temperature activated thermal switch positioned to sense ambient temperature and adapted to energize the blower only when the ambient temperature is above a predetermined value, and a power switch connected in series to the thermal switch to activate and deactivate the system. The power switch is preferably adapted to automatically activate and deactivate the system when the refrigerator is turned on and off respectively.

9 Claims, 3 Drawing Sheets

AMBIENT TEMPERATURE CONTROL FOR ABSORPTION REFRIGERATOR

This application is a continuation of U.S. application Ser. No. 09/363,710, filed on Jul. 29, 1999, which is now U.S. Pat. No. 6,098,414 which in turn is a continuation of U.S. application Ser. No. 08/985,638, filed on Dec. 5, 1997, which is now U.S. Pat. No. 5,966,965.

BACKGROUND OF THE INVENTION

This invention relates generally to ventilation systems and, more specifically, to an improved ventilation system for an absorption refrigerator located within the interior of a recreational vehicle.

It is common for recreational vehicles to have refrigerators on board for cooling and preserving food and drinks in a compartment. These refrigerators are usually absorption-type refrigerators which use a heat source to effect refrigeration. An absorption refrigerator has a heat generator which heats a solution of a refrigerant and an absorbent. The heat releases the refrigerant from the absorbent to form a high pressure refrigerant vapor. The refrigerant vapor is condensed in a cooling condenser. Low pressure solution from the heat generator is sprayed on the refrigerant vapor in an absorber to absorb the vapor. The absorption causes the pressure of the vapor to be reduced, thereby causing evaporation in an evaporator between the condenser and the absorber. The refrigerant vapor expands in the evaporator which causes a temperature drop in the refrigerant which is used to cool the compartment. The solution of refrigerant and absorbent is then pumped back to the heat generator.

Absorption refrigerators are favored in vehicles, such as campers or recreational vehicles, because a compressor is not required and the heat generator can be an electrical resistance heater or a gas heater. The electrical resistance heater can be powered by a direct current supply of the vehicle or a commercial alternating current supply such as those available at campgrounds. The gas heater can be fueled by propane gas which is usually carried on recreational vehicles. Combustion of the propane creates waste gasses, such as carbon dioxide, which should be vented outside the vehicle.

It is typically necessary to cool the condenser and absorber of the refrigerator. This is economically achieved by creating a "natural draft" airflow over the condenser and absorber. To create this airflow, a duct is provided with intake vent in a side wall or floor and an exhaust vent in the ceiling to permit airflow over the condenser and absorber. In some installations, a fan is provided to create a "forced draft" airflow. Such fans run continuously and are a significant drain on available power.

One such installation is in recreational vehicles which are provided with a retractable structure usually referred to as a "slide-out" portion or room. The slide-out portion enables the recreational vehicle to have an exterior width which meets road restrictions during transportation a width which provides a comfortable interior layout during use. See U.S. Pat. No. 4,500,132 for an example of a recreational vehicle with a slide-out portion. When a refrigerator is located in the slide-out room the duct must move along with the slide-out room and a roof-top exhaust vent cannot be used.

Accordingly, there is a need in the art for an improved ventilation system for an absorption-type refrigerator which can be placed at any location in the recreational vehicle, including slide-out rooms, to increase the flexibility of floor plan designing. Airflow over the condenser and absorber should be facilitated by the ventilation system while conserving power. Air used to cool the condenser and absorber should come from outside the vehicle and be exhausted to carry heat and combustion products outside the vehicle.

BRIEF SUMMARY OF THE INVENTION

The present invention provides a ventilation system for a refrigerator having a condenser and located in a vehicle having exterior side walls which overcomes at least some of the above-noted problems of the related art. The ventilation system includes a generally vertical air passage in which the condenser is located, a lower vent communicating the air passage with ambient air surrounding the vehicle, an upper vent communicating the air passage with ambient air surrounding the vehicle, and an air assist system. The air assist system includes a blower positioned to promote air flow within the air passage over the condenser when energized and a thermal controller positioned to sense ambient temperature to control the blower.

The vents and air passage create a chimney effect to carry heat and exhaust gasses upwardly away from the refrigerator. The blower is provided to promote airflow through the duct only when efficient natural airflow cannot be obtained. Preferably, the thermal controller is switch located in the air passage near the lower vent. The blower should be activated when the ambient temperature, of the inlet air, rises above a predetermined level which indicates that forced airflow is necessary.

The ventilation system can be used with an absorption refrigerator whether it is heated by electricity, gas or both. The system could also apply to other appliances in a vehicle which require ventilation, such as a compression refrigerator, an air conditioner, or furnace.

The ventilation system according to the invention allows a refrigerator to be located anywhere in a vehicle floor plan but is particularly advantageous when the refrigerator is located in a slide-out room. When located in a slide-out room, the upper vent can be located in a side wall without the inefficiency of a full forced draft system.

BRIEF DESCRIPTION OF THE SEVERAL VIEWS OF THE DRAWING

These and further features of the present invention will be apparent with reference to the following description and drawings, wherein.

DETAILED DESCRIPTION OF PREFERRED EMBODIMENTS

Figure 1:
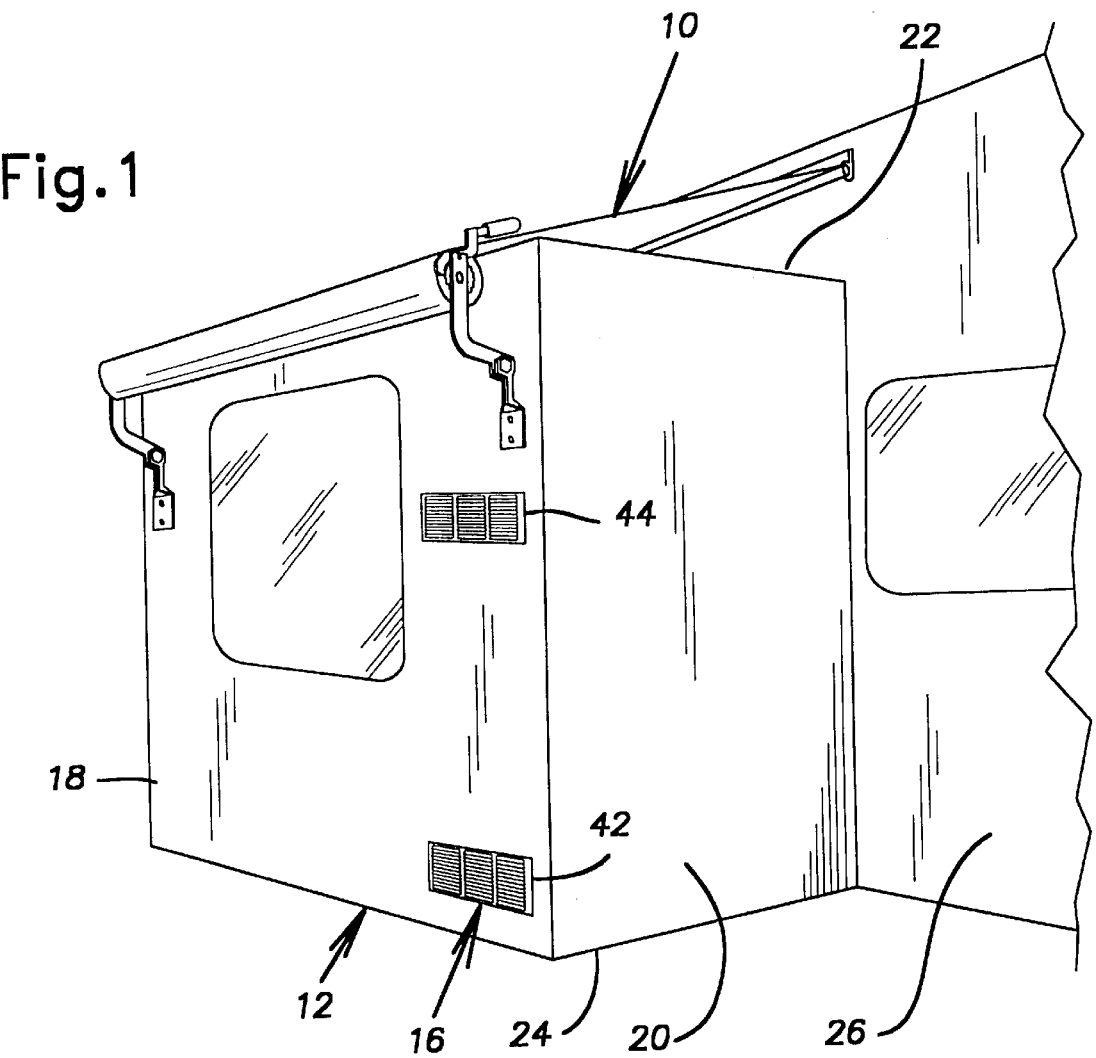
FIG. 1 is a perspective view of a slide-out room of a recreational vehicle having a ventilation system according to the present invention for an absorption refrigerator.
Figure 2:
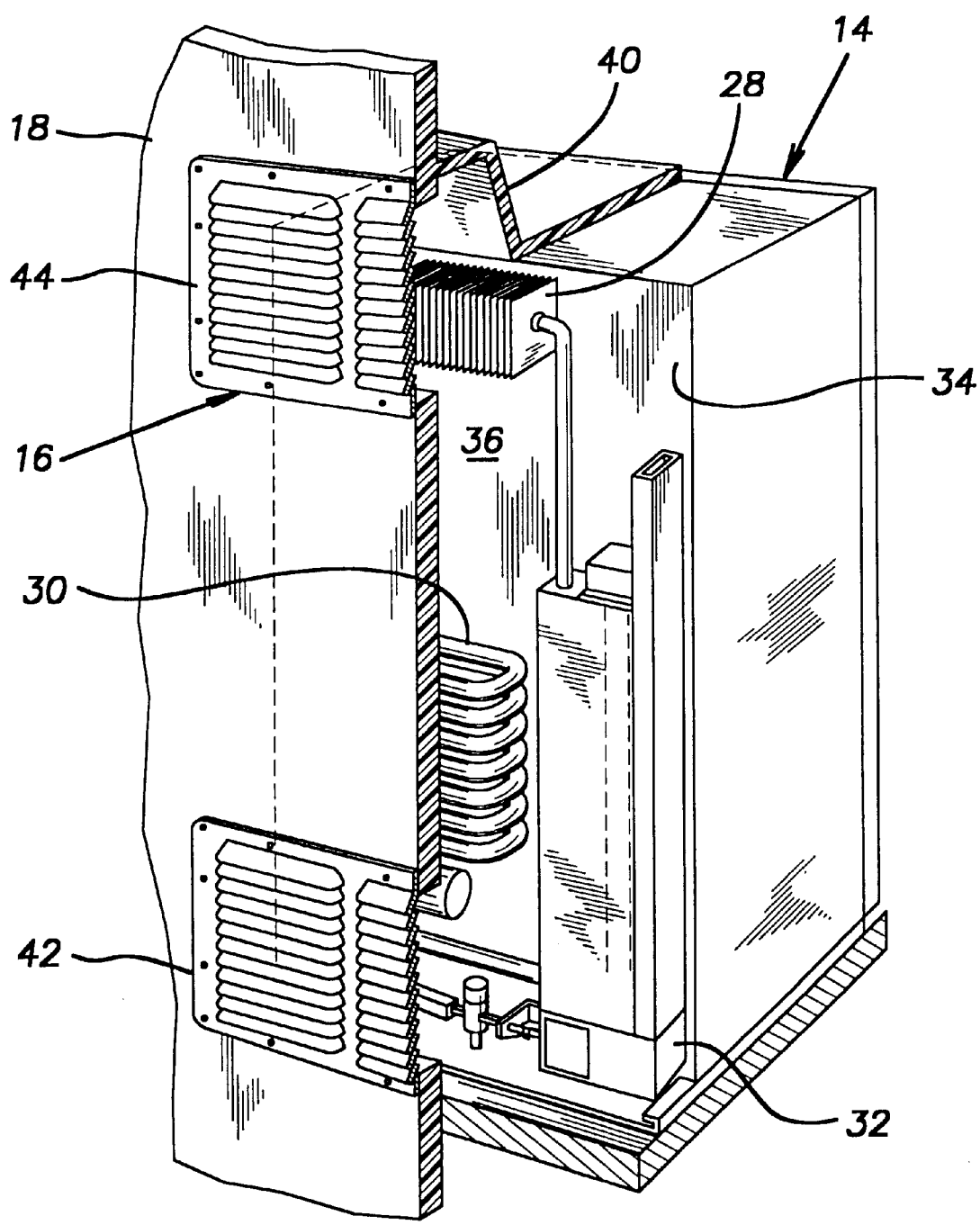
FIG. 2 is an enlarged perspective view of a portion of the recreational vehicle of FIG. 1 showing the ventilation system with portions of the slide-out room cut away for clarity.

FIGS. 1 and 2 illustrate a recreational vehicle 10 having movable portion or slide-out room 12. Located within the slide-out room 12 is a refrigerator 14 having an improved ventilation system 16 according to a preferred embodiment of the present invention. As used herein, the term recreational vehicle is intended to include mobile homes which are generally permanently installed at a site but are transported along a roadway, as well as typical travel trailers, campers, and motor homes of all types.

The illustrated slide-out room 12 is generally rectangular or box-like in shape having an outer or side wall 18, and a pair of end walls 20 (only one is visible in FIG. 1). In addition the slide-out room 18 has a generally flat, horizontally extending roof 22 and a generally flat horizontally extending floor 24. The slide-out room 12 is movable between an extended position (illustrated in FIG. 1) in which it laterally projects from a side wall 26 of the recreational vehicle 10 and a retracted position (not specifically shown) in which it extends into the recreational vehicle 10 with the side wall 18 of the slide-out room 12 near the side wall 26 of the recreational vehicle 10. In the retracted position, the remainder of the slide-out room 12 extends through an opening in the side wall 26 of the recreational vehicle 10 and into the interior of the recreational vehicle 10 so that the total width of the recreational vehicle 10 is within the limits normally required.

With the slide-out room 12 in the retracted position, the recreational vehicle 10 can travel on roadways to a desired location. Once the recreational vehicle 10 reaches the location where it is to be used, the slide-out room 12 is moved to the extended position which increases the interior space of the recreational vehicle 10 by increasing the width of the interior along at least a portion of the recreational vehicle length. The refrigerator 14 along with other appliances and/or furniture is located within the slide-out room 12 which is carried out beyond the unextended interior of the recreational vehicle 10 when the slide out room 12 is extended.

In effect, the slide-out room 12 permits the recreational vehicle 10 to be narrowed when road travelling and allows the interior space of the recreational vehicle 10 to be widened when not travelling. Even relatively small increases in the width greatly improve the potential interior arrangement of appliances, such as the refrigerator 14, and furniture.

The refrigerator 14 is installed inside the slide-out room 12 of the recreational vehicle 10 and has a cooling compartment for storing food stuffs and other items to be chilled and a rear wall which is spaced from the side wall of the slide-out room. It is noted, however, that the refrigerator 14 can be located at any selected location inside the recreational vehicle 10, either on the floor or supported above the floor within the scope of the present invention. Preferably, the refrigerator 14 is located in a convenient location for access by persons in the recreational vehicle 10 as determined by the floor plan of the vehicle 10.

Figure 3:
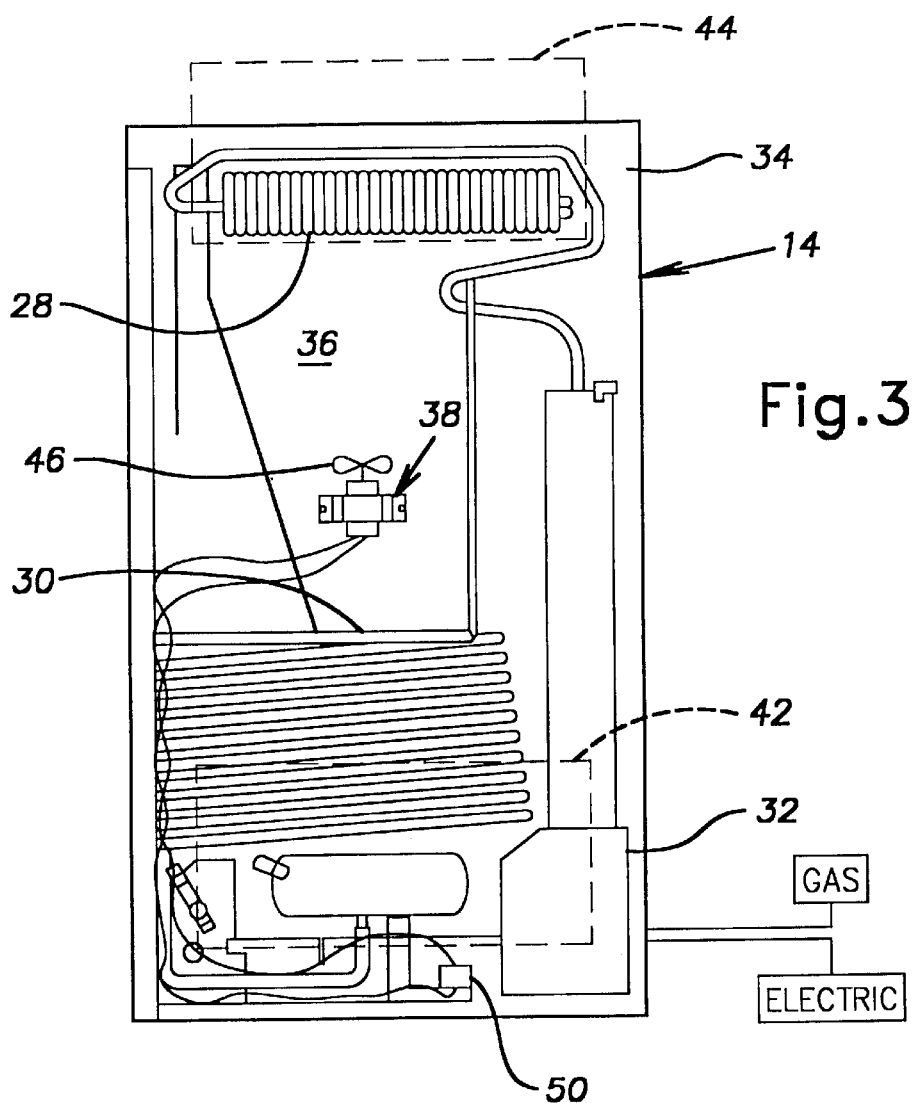
FIG. 3 is a diagrammatic view of the ventilation system according to the present invention.

As best shown in FIGS. 2 and 3, the illustrated refrigerator 14 is of the absorption cycle type and includes a condenser 28, an absorber 30, and a hear generator or heater 32. The condenser 28, the absorber 30, and the heater 32 are located at the rear wall 34 of the refrigerator 14 and between the refrigerator rear wall 34 and the side wall 18 of the slide-out room 12. The rear wall 34 of the refrigerator 14 can be adapted to permit access to the heater 32 and the other components 28, 30 of the refrigerator. The heater 32 can be powered by fuels, such as LP, carried onboard the recreational vehicle 10 or by electrical power. The source of electrical power can be, for example, a direct current (DC) power supply of the recreational vehicle 10 or an alternating current (AC) power supply such as those located at a campground.

The ventilation system 16 includes an air passage or duct 36 for passing air over the components 28, 30 of the refrigerator 14 and an air assist system 38 for selectively forcing air through the duct 36. The duct 36 is generally vertically extending and is formed by the space between the rear wall 34 of the refrigerator 14 and the side wall 18 of the slide-out room 12. Suitable duct members 40 extend between the refrigerator 14 and the side wall 18 to enclose the duct 36. Alternatively, the duct 36 can be fully formed by a suitable duct member and/or can be located within the refrigerator housing.

The duct 36 includes a lower or intake vent 42 and an upper or exhaust vent 44. The lower vent 42 is provided in the side wall 18 of the slide-out room 12 near the bottom of the duct 36 and near the bottom or below the refrigerator 14. Preferably, the lower vent 42 is located at or below the absorber 30. The upper vent 44 is also provided in the side wall 18 of the slide-out room 12 near the top of the duct 36 and near the top or above the refrigerator 14. Preferably, the upper vent 44 is located at or above the condenser 28. As illustrated, the lower and upper vents 42, 44 are each in the side wall 18 of the slide-out room 12. The duct 36, however, can have other suitable configurations within the scope of the present invention. For example, the lower vent 42 can be through the floor 24 of the slide-out room 12 or the floor of the recreational vehicle 10, the upper vent 44 can be through the roof of the recreational vehicle 10 (if the refrigerator is not located in the slide-out room 12), or the lower and upper vents 42, 44 can be through a different wall of the recreational vehicle 10.

The lower and upper vents 42, 44 are provided with covers having openings therein for passage of air therethrough. The covers can be formed from any suitable material such as, for example, plastic or sheet metal. Note that the cover of the upper duct 44 must withstand some degree of heating. The shown vents 42, 44, and covers associated therewith, are generally rectangularly-shaped but any other suitable shapes may be utilized.

The duct 36 is vertically arranged to permit ambient air to enter the duct 36 from outside the recreational vehicle 10 through the lower vent 42, pass vertically through the duct 36 over the refrigerator components 28, 30, and exit the duct 36 and the recreational vehicle 10 through the upper vent 44. The condenser and absorber 28, 30 constitute heat dissipating or heat rejecting members of the refrigerator refrigeration system. The heat rejected from these components 28, 30 causes an upward flow of air within the duct 36 by natural draft. The air flow through the air passage 36 cools the condenser and absorber 28, 30 and carries heat outside the recreational vehicle 10 through the upper vent 44. The vertical arrangement of the duct 36 promotes air flow by creating a chimney effect or natural draft. That is, the air heated by the condenser 28, absorber 30, and heater 32 tends to rise through the duct 36 until it exits the upper vent 44 and draws in cooler ambient outside air through the lower vent 42. It is noted that the air flow of the duct 36 can also provide combustion air and/or cooling air to the heater 32 through the lower vent 42 and exhaust combustion products and/or cooling air from the heater 32 through the upper vent 44.

The air assist system 38 is provided to automatically transform the "natural air flow" system into a "forced air flow" system when the air temperature is not sufficient to support natural air flow and adequately cool the refrigerator components 28, 30. The air assist system 38 increases air velocity within the duct 36 to allow for optimum operation of the refrigeration system of the refrigerator 14.

Figure 4:
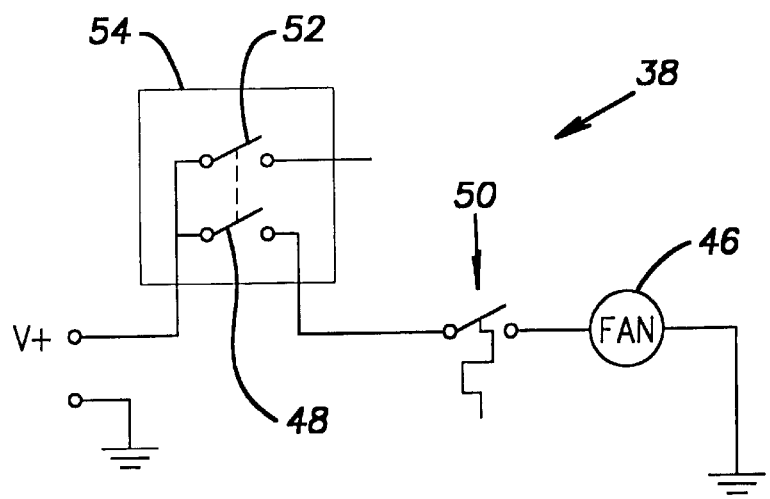
FIG. 4 is a schematic diagram of an air-assist system of the ventilation system of FIG. 3.

As best shown in FIGS. 3 and 4, the air assist system 38 includes a blower or fan 46, a power switch 48, and a limit or thermal switch 50. The blower 46 is located in the duct 36.

Preferably, the blower 46 is located generally midway between the lower vent 42 and the upper vent 44 and between the condenser 28 and the absorber 30. The blower 46, however, should permit airflow through the duct 36 when the blower 46 is not operating. The blower 46 may be a commercially available blower of any suitable type. The blower 46 is preferably a 12 V DC blower.

The blower 46 is connected to the vehicle power distribution system by a control circuit including the power switch 48 and the thermal switch 50. The power switch 48 is preferably connected to a main on-off switch 52 of a refrigerator control module 54 which controls power to the refrigerator 14. The power switch 48 is automatically closed when the on/off switch 52 of the refrigerator 14 is closed and automatically opened when the on/off switch 52 of the refrigerator 14 is opened. It is noted that a manual on/off switch can be utilized instead of or in addition to the illustrated power switch 48 so that the operator can manually activate and deactivate the air assist system 38.

It is also noted that the refrigerator 14 is powered by both a 12 V DC battery and a 115 V AC supply. The blower. 46 is preferably linked to the switch 52 controlling battery power to the refrigerator 14, as shown, but alternatively can be linked to a switch controlling AC power to the refrigerator 14.

The thermal switch 50 is connected in series with the power switch 48 and therefore connects to the blower 46 to the power supply. The thermal switch 50 includes an electrical switching mechanism and a temperature sensor that operates the switching mechanism. The thermal switch 50 is preferably a normally open switch which closes when the temperature sensed by the temperature sensor rises above a certain level.

The thermal switch 50 is preferably located within the duct 36 near the lower vent 42 so that the thermal switch 50 senses the temperature of air entering through the lower vent 42 which is at ambient outdoor temperature. This location is upstream of the components 28, 30, 32 of the refrigerator 14 located in the duct 36 and heating the air within the duct 36. The thermal switch 50 can be located at alternative locations. The thermal switch 50, however, should be located in a position so that it gives an indication of the temperature of ambient air surrounding the recreational vehicle 10. For example the thermal switch 50 could be located on the vehicle exterior near the intake vent 42. The thermal switch 50 can be attached by an suitable means such as, for example, screws, clips, or adhesives. The thermal switch 50 can comprise a temperature sensor connected to a remotely operated switch. The temperature sensor could then be located at the desired location and the switch could be located in the refrigerator control module 54.

The air assist system 38 becomes functional only when the refrigerator on/off switch 52 is turned on, due to the power switch 48 attached to the refrigerator control module 54, and the ambient outdoor temperature rises above a predetermined level, due to the thermal switch.450 located at the lower vent 42. When both the power switch 48 and the thermal switch 50 are closed, power energizes the blower 38 to assist air movement through the duct 36 and over the components 28, 30 of the refrigerator 14. The power switch 48 prevents the air assist system 38 from draining the battery when the refrigerator 14 is not turned on at its on/off switch 52. The thermal switch 50 prevents operation of the air assist system 78 at low outdoor ambient temperatures, when it is not needed, so that the blower 46 is energized only when air movement in the duct 36 requires assistance.

In operation, the refrigerator 14 is connected to an unswitched power supply of the recreational vehicle 10. When the refrigerator 14 is not operational, the on/off switch 52 of the refrigerator control module 54 is open and the power switch 48 of the air assist system 38 is open, thereby disabling the blower 46. When the on/off switch 52 of the refrigerator control module 54 is closed to turn on the refrigerator 14, the power switch 48 of the air assist system 38 is closed. When the power switch 48 is closed, operation of the blower 46 is controlled by the thermal switch 50.

The thermal switch 50 normally remains open but closes to energize the blower 46 when the ambient outdoor temperature rises to a predetermined level wherein air movement in the duct 36 requires assistance. On hot days, for example, the natural air flow through the duct 36 may not be sufficient to cool the condenser 28, and the condenser 28 may rise above a desired temperature. When energized, the blower 46 augments air flow through the duct 36 until the outdoor ambient temperature drops below the selected level and the blower 46 is deactivated. The air assist system 38 continues to operate in this manner until the on/off switch 52 of the refrigerator control module 54 is opened, thereby opening the power switch 48 of the air assist system 38 and disabling the blower 46.

Although particular embodiments of the invention have been described in detail, it will be understood that the invention is not limited correspondingly in scope, but includes all changes and modifications coming within the spirit and terms of the claims appended hereto.

What is claimed is:

1. A ventilation system for an appliance having a condenser, an absorber, and a heat generator, being located in a recreational vehicle slide-out room having a refrigerator installed inside the slide-out room of the recreational vehicle, the refrigerator having a rear wall which is spaced from the rear wall of the slide-out room; the slide out room also having a floor, exterior side walls, and a roof, said ventilation system comprising:

a generally vertical air passage for passing air over the absorber, the condenser and the heat generator, the vertical air passage extending vertically and is formed by the space between the rear wall of the refrigerator and the side walls of the slide-out room;

a lower vent communicating the air passage with ambient air surrounding the vehicle;

an upper vent communicating the air passage with ambient air surrounding the vehicle; and an air assist system including a blower in the vertical air passage to promote air flow within the air passage over the condenser, the absorber, and the heat generator when energized and a thermal controller positioned to sense ambient temperature to control said blower, wherein said thermal controller is adapted to control power provided to said blower when the sensed ambient temperature is above a predetermined value below which natural draft airflow through said vertical passage sufficiently cools the condenser and above which natural draft airflow through said vertical passage does not sufficiently cool the condenser.

2. A ventilation system according to claim 1, wherein the blower is located generally midway between said lower vent and said upper vent.

3. A ventilation system according to claim 1, wherein said thermal controller is adapted to energize said blower only when the ambient temperature is above a predetermined value.

4. A ventilation system according to claim 1, wherein both said lower duct and said upper duct are located in the exterior side walls of the vehicle.

5. A ventilation system according to claim 1, wherein said air assist system further includes a power switch connected in series to said thermal controller to activate and deactivate said air assist system.

6. A ventilation system according to claim 5, wherein said power switch is connected to an on/off switch of the appliance to automatically activate and deactivate said air assist system.

7. A ventilation system according to claim 5, wherein said power switch is a manual switch to manually activate and deactivate said air assist system.

8. A ventilation system according to claim 1, wherein said thermal controller is a thermal switch.

9. A ventilation system according to claim 1, wherein said thermal controller is located within said air passage near said lower vent.

\* \* \* \* \*